(12) United States Patent
Short et al.

(10) Patent No.: US 7,405,847 B2
(45) Date of Patent: Jul. 29, 2008

(54) DEVICE WITH SCANNING FEATURE AND METHOD

(75) Inventors: David Bradley Short, San Diego, CA (US); Gary W. Gragg, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1017 days.

(21) Appl. No.: 10/377,423

(22) Filed: Feb. 28, 2003

(65) Prior Publication Data

US 2004/0184109 A1    Sep. 23, 2004

(51) Int. Cl.
*H04N 1/04* (2006.01)
*H04N 1/40* (2006.01)

(52) U.S. Cl. .................. 358/474; 358/497; 358/494; 358/471

(58) Field of Classification Search .................. 358/474, 358/497, 401, 475, 494, 471, 473, 472, 505
See application file for complete search history.

(56) References Cited

U.S. PATENT DOCUMENTS

| 5,138,670 | A | * | 8/1992 | Nakajima et al. | ........... 382/282 |
| 5,546,144 | A | * | 8/1996 | Lam et al. | ................... 353/120 |
| 5,680,223 | A |   | 10/1997 | Cooper | |
| 5,945,656 | A | * | 8/1999 | Lemelson et al. | ...... 235/462.01 |
| 6,669,085 | B1 | * | 12/2003 | Bergen | ........................ 235/375 |
| 7,149,006 | B2 | * | 12/2006 | Tuchtenhagen | ............. 358/474 |
| 7,212,312 | B2 | * | 5/2007 | Motamed | ..................... 358/1.9 |
| 2001/0043374 | A1 |   | 11/2001 | Lin | |
| 2002/0051201 | A1 |   | 5/2002 | Winter | |
| 2002/0150311 | A1 |   | 10/2002 | Lynn | |
| 2003/0016404 | A1 |   | 1/2003 | Tecu | |
| 2003/0025951 | A1 |   | 2/2003 | Pollard | |

FOREIGN PATENT DOCUMENTS

| JP | 07244553 | 9/1995 |
| JP | 2001285548 | 10/2001 |
| JP | 2002254775 | 9/2002 |

OTHER PUBLICATIONS

EP Search Report In Re: EP 04 25 0429, Examiner Roche, N., Aug. 25, 2005.

* cited by examiner

*Primary Examiner*—Houshang Safaipour

(57) ABSTRACT

The present invention provides a device with a scanning feature that includes a body and a scanner. An attachment with a scan code, including data or information, is positioned within the scanning range of the scanner and the data or information received from the scan code by the scanner is used by the device, for example, to configure one or more features associated with the device.

50 Claims, 7 Drawing Sheets

DEVICE WITH SCANNING FEATURE AND METHOD

BACKGROUND OF THE INVENTION

Electronic devices such as, for example, copiers, multi-function printers or scanners are commonly configured with attributes specific to their destination location. For example, such a device configured for use in the United States is commonly configured with different language attributes than those for a device configured for use in another country. If the device is to be configured by the manufacturer prior to its shipment to the customer, it can complicate the manufacturer's ordering and assembly processes. If the device is to be configured by the customer after its receipt, errors made by the customer during the configuration process can lead to incorrect operation, customer dissatisfaction, and in some cases return of the device to the manufacturer and the loss of a sale. In addition to or in lieu of language specifications, it may be desirable for other features and attributes of such a device to be configured for a destination location or by a user for various applications.

For these and other reasons, there is a need for the present invention.

SUMMARY OF THE INVENTION

The present invention provides a device with a scanning feature that includes a body and a scanner. An attachment with a scan code, including data or information, is positioned within the scanning range of the scanner and the data or information received from the scan code by the scanner is used by the device, for example, to configure one or more features associated with the device.

Other aspects of the invention will be apparent to those skilled in the art after reviewing the drawings and the detailed description below.

BRIEF DESCRIPTION OF THE DRAWINGS

The present invention will now be described, by way of example, with reference to the accompanying drawings, in which.

DETAILED DESCRIPTION OF PREFERRED EMBODIMENTS

It is to be understood that the present invention may be embodied in other specific forms without departing from its essential characteristics. The illustrated and described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

Figure 1A:
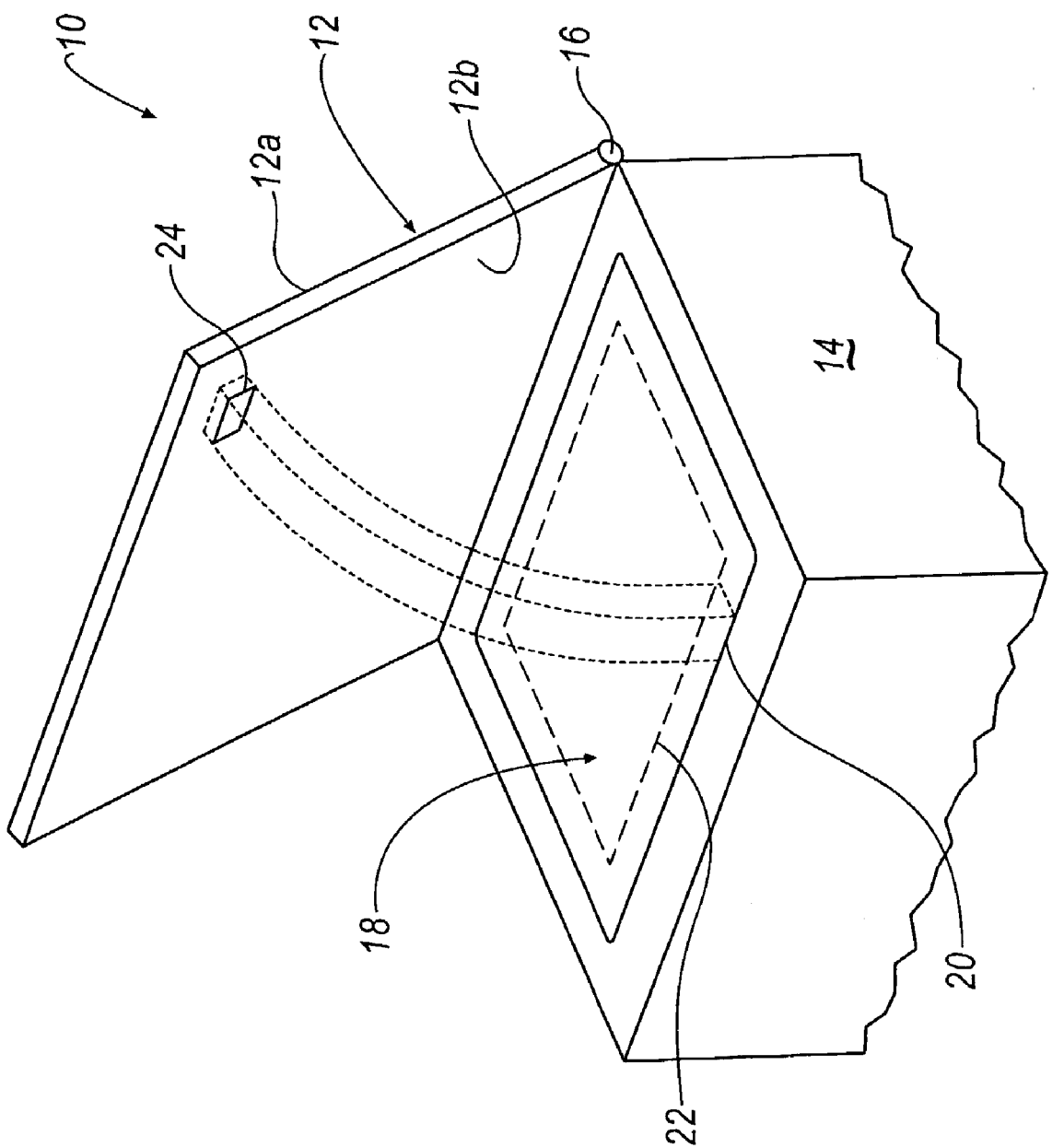
FIG. 1A is a perspective view of a device according to an embodiment of the present invention.

Referring now to FIG. 1A, an embodiment of a device 10 according to the present invention is shown and described. Device 10 may be, for example, a scanner, a copier, or a multifunction printer that functions as at least one of a scanner and a copier, in addition to functioning as a printer. Device 10 typically includes a cover portion or lid 12 attached or otherwise separable from and connected to body 14, such as by one or more connection members or hinges 16. Body 14 includes a viewing surface or pane 18 that is made of glass, plastic, or other material that allows a scanner or scanning means, such as an optical assembly within body 14, to image and scan an object placed thereon or substantially adjacent thereto.

In one embodiment, viewing pane 18 includes an outer border 20 and an inner border 22. Outer border 20 defines the maximum viewing area of viewing pane 18. Inner border 22 defines a common imaging region of the viewing pane 28. Markings may or may not identify such regions on the viewing pane. For example, the common imaging region defines a border in which objects are placed to be scanned. In such a configuration, the portion of objects placed on viewing pane 18 that fall outside inner border 22 are typically not imaged by the device 10. However, as the viewing pane 18 does extend to outer border 20, portions of objects extending from or between inner border 22 and outer border 20 may be imaged if the device 10 is so configured. For example, and as will be described subsequently in greater detail, an object containing configuration information for device 10 may be positioned in the region between the outer border 20 and the inner border 22 for scanning during startup. Alternatively, the device may not include inner and outer borders and the viewing pane may take up all or substantially all of the scanning range or field of the device.

In another embodiment, lid 12 includes two opposing sides, 12a and 12b, respectively. When lid 12 is closed, side 12b is proximate or adjacent viewing pane 18 while side 12a is distally located from viewing pane 18. Lid 12 further includes an aperture 24 that extends through the lid 12 from side 12a to side 12b. When present, aperture 24 is positioned on lid 12 such that when the lid 12 is closed, aperture 24 is positioned on or about the area between inner border 22 and outer border 20. However, it will be understood that aperture 24 can instead be positioned anywhere over viewing pane 18.

Moreover, the aperture need not take the form of a hole or void, but alternatively can take the form of a light-transmissible material (e.g., a glass, plastic, or other sufficiently transparent material) that extends through a portion of the lid to permits the scanning of an object placed on one side of the lid to be scanned from the other. Further, in various alternative embodiments, lid 12 may not be comprised of one or more apertures, but instead may include a recessed portion or designated attachment area or region (whether marked or unmarked) on side 12b that can be used to receive attachments (as later discussed in further detail).

Figure 1B:
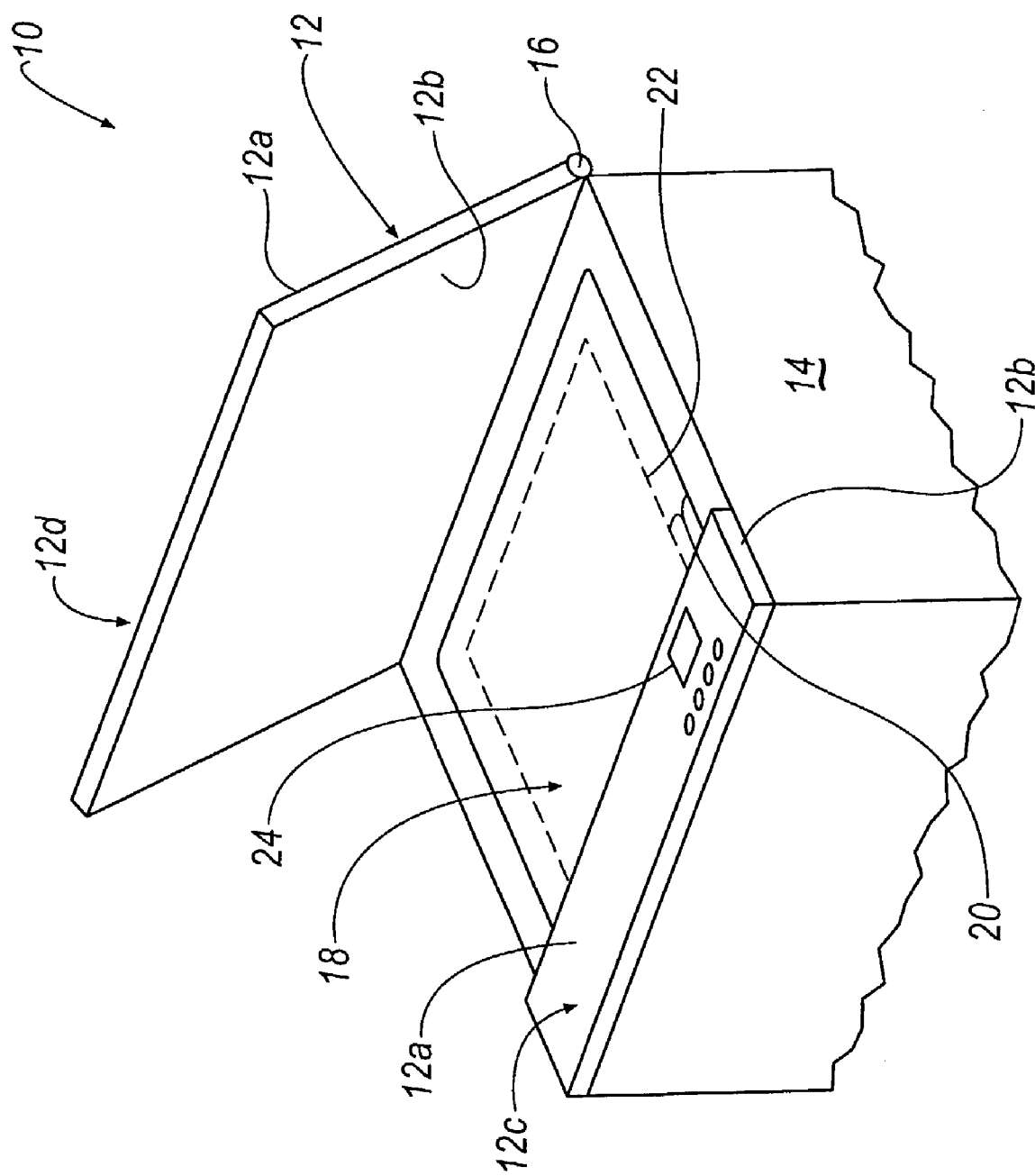
FIG. 1B is a perspective view of a device according to an embodiment of the present invention.

Referring to FIG. 1B, the illustrated lid 12 includes lid portion 12c and 12d. Lid portion 12c is connected or otherwise affixed to the surface of body 14 while lid portion 12d is connected or attached to body 14, such as by a connection means or hinge 16. It should be noted that, when employed, one or more connection means or hinges 16 can be on any side of lid portions 12c or 12d and are not limited to the configurations shown in the figures. In one configuration, aperture 24 passes through side 12a to 12b of lid portion 12c. Viewing pane 18 is positioned under side 12c such that it is substantially positioned under aperture 24. Though not a requirement, inner border 22 often extends up to or substantially about the lid portion 12c, while outer border 20 extends under or substantially under lid portion 12c and aperture 24.

Figure 2:
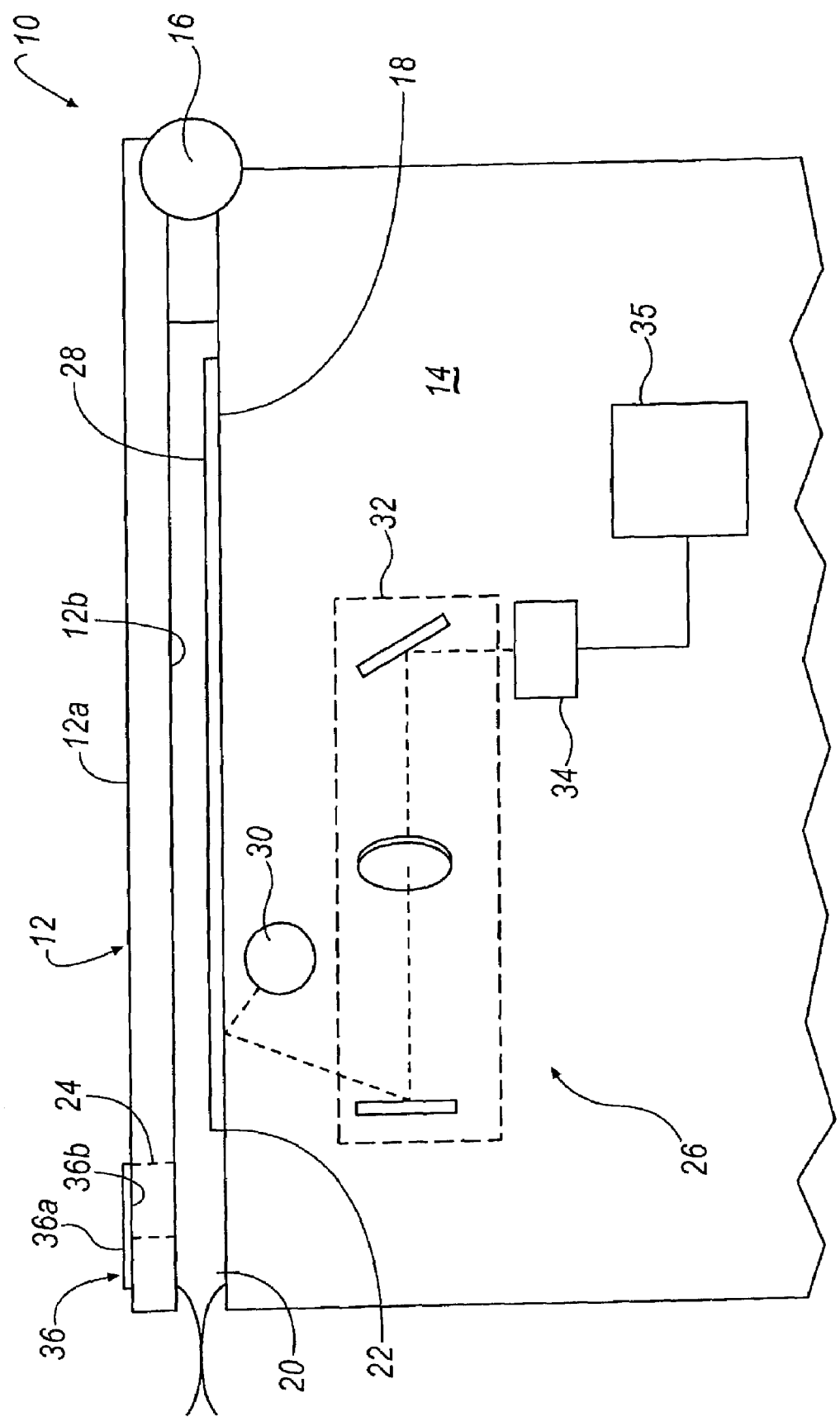
FIG. 2 is a side view of a device according to an embodiment of the present invention.
Figure 3:
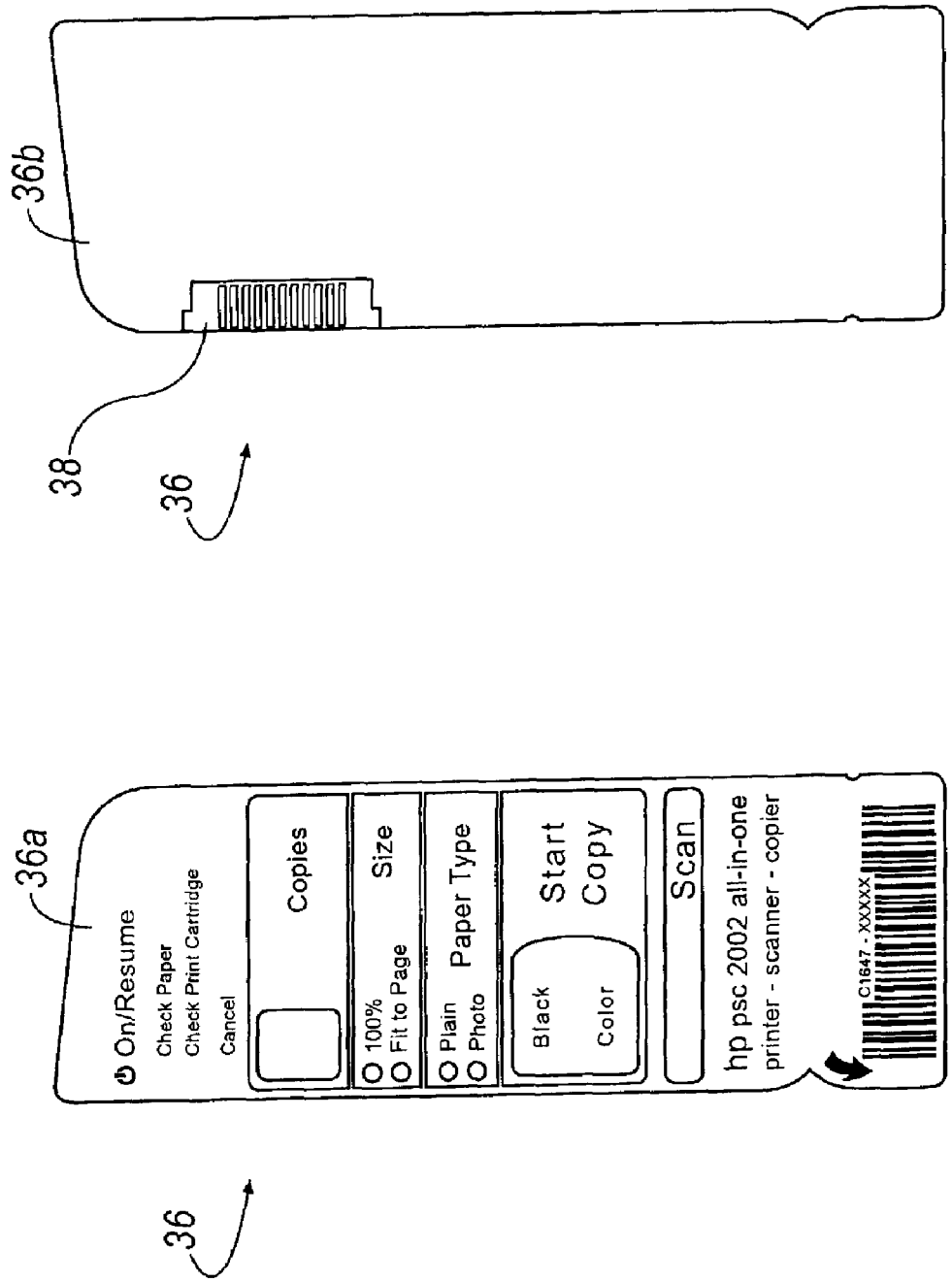
FIG. 3A is a top view of a configuration attachment for a device according to an embodiment of the present invention.
FIG. 3B is a bottom view of a configuration attachment for a device according to an embodiment of the present invention.

In FIG. 2, a scanning means, such as an optical assembly 26, is provided internal to body 14 to illuminate and scan an object 28, such as paper, that is positioned on or adjacent viewing pane 18. In one configuration, an illuminating means or device, such as an LED or bulb 30, illuminates object 28 to provide reflected light from the object 28 to one or more optical devices or members, referred to herein as optics 32. Optics 32, in turn, transfer or direct the reflected light from object 28 to a receiver 34. Receiver 34 can comprise any device capable of capturing and/or digitizing the relevant data or information from the light signal. The receiver 34 may include, by way of example and without limitation, any of a variety of known devices, including a contact imaging sensor (CIS) or a charge coupled device (CCD) that create and digitize an electrical current in response to illumination on the surface of the receiver 34. As will readily be understood by one skilled in the art, the scanned information can then be fed to a processor 35 for processing and use. The processor may receive the information in a form that can be directly utilized, or may, if required, perform manipulations (such as recognition and/or conversion of a barcode and/or text) in order to obtain useable information.

Referring now to FIGS. 2-5, the present invention is described in further detail. In FIG. 2, an attachment 36 is applied or otherwise connected to side 12a of lid 12. Alternatively, when an aperture is not employed, the attachment may be affixed or otherwise connected or attached to side 12b of the lid or other surfaces of the device 10, provided the applicable portion of the attachment is readable or otherwise within the view for the scanner optics.

It should be noted that attachment 36 may take any number of forms that are capable of supplying information to the device. For example, without limitation, the attachment may include a piece of paper or plastic media adhesively adhered to side 12a, a plate affixed by screws or other mechanical means, a panel integrally molded or connected to the device, or any other suitable material with data or information positioned in the viewing range to be scanned by the device. In one embodiment, attachment 36 comprises a pre-printed configuration label that is adhesively attached to side 12a, wherein a portion of the attachment extends over aperture 24. In another embodiment, the attachment will be one that is capable of being easily affixed and/or replaced by a user, such as when a device 10 is to be configured for another purpose or is later transferred to a new location in another country. For example, the label may include tabs that are inserted into mating slots on side 12a for mounting, thus allowing for ease of replacement.

Attachment 36 comprises a label side 36a and a configuration side 36b. As shown in FIG. 3A, label side 36a may include, for example, instructions and/or other information for use with or operation of the device 10. With reference to the sample device illustrated in FIG. 1B, label side 36a is shown including operating information for buttons and/or indicators positioned adjacent to the attachment 36. As shown in FIG. 3B, the configuration side 36b includes scan-able or readable barcode data or other forms of user or machine readable information (collectively referred to as a "scan code"), such as a barcode 38. By way of example, without limitation, the barcode 38 may include, inter alia, operating and/or configuring information that can be scanned or read by device 10, including self-configuration information and/or instructions. The processor may receive the scan code in a form that can be directly utilized, such as a binary configuration code, but may, if required, perform manipulations (such as recognition and/or conversion of a barcode and/or text) in order to obtain the configuration information. A memory (not shown) coupled to processor 35 includes processor-readable instructions executable by processor 35 to control the scanner or scanning means, process the scanned information, and configure the device in accordance with the scanned information.

Figure 4:
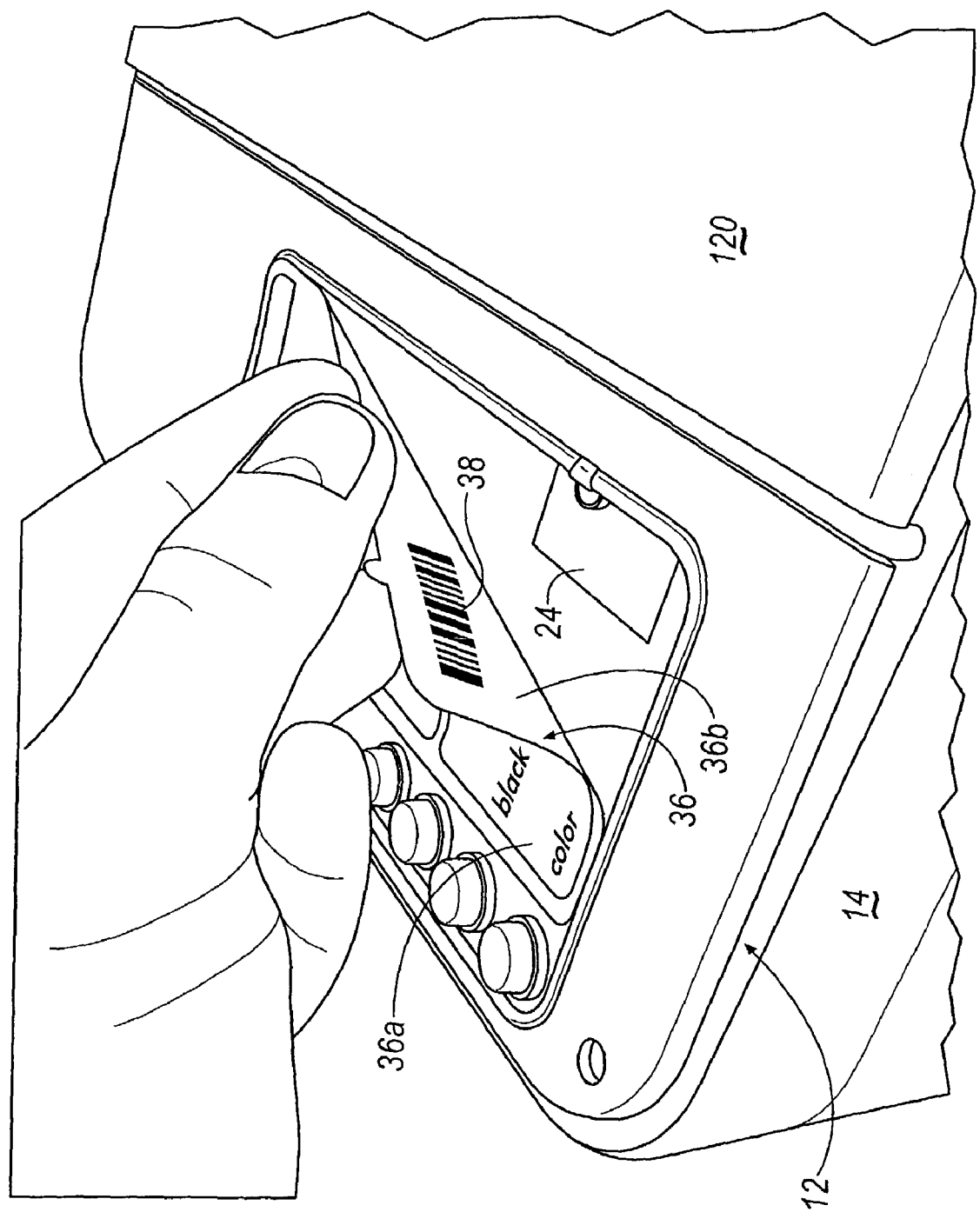
FIG. 4 is a perspective operational view of a device according to an embodiment of the present invention.

As shown in FIG. 4, attachment 36 may be applied to side 12a of lid 12, such that barcode 28 is positioned over the aperture 24. This positions barcode 28 in optical view of optical assembly 26. However, again as previously noted, the device is not required to include an aperture 24 and the attachment 36 may instead be applied or otherwise connected to side 12b, so long as the relevant portion of the attachment 36 is capable of being scanned by the optics of the device 10.

Figure 5:
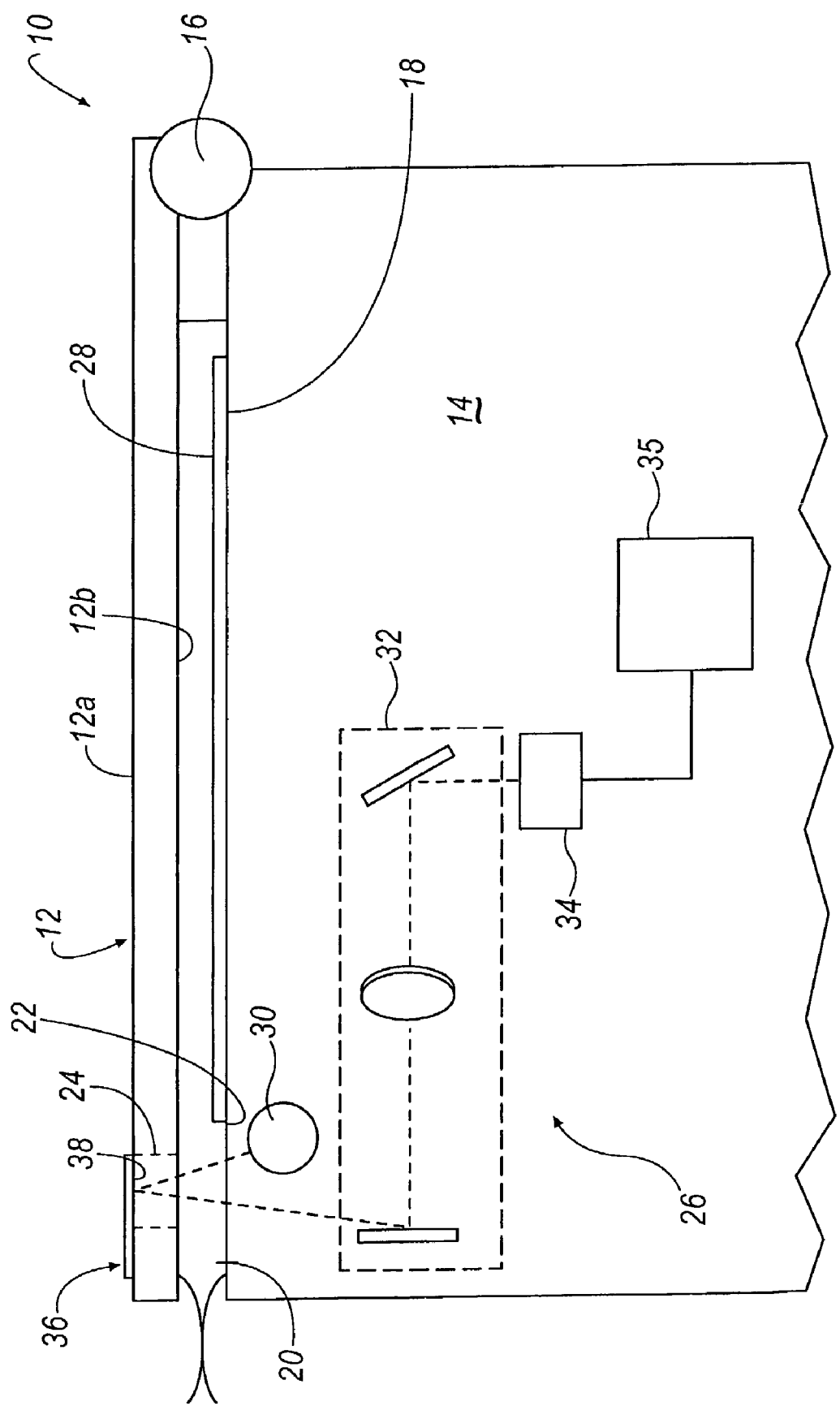
FIG. 5 is a side view of a device according to an embodiment of the present invention.
Figure 6:
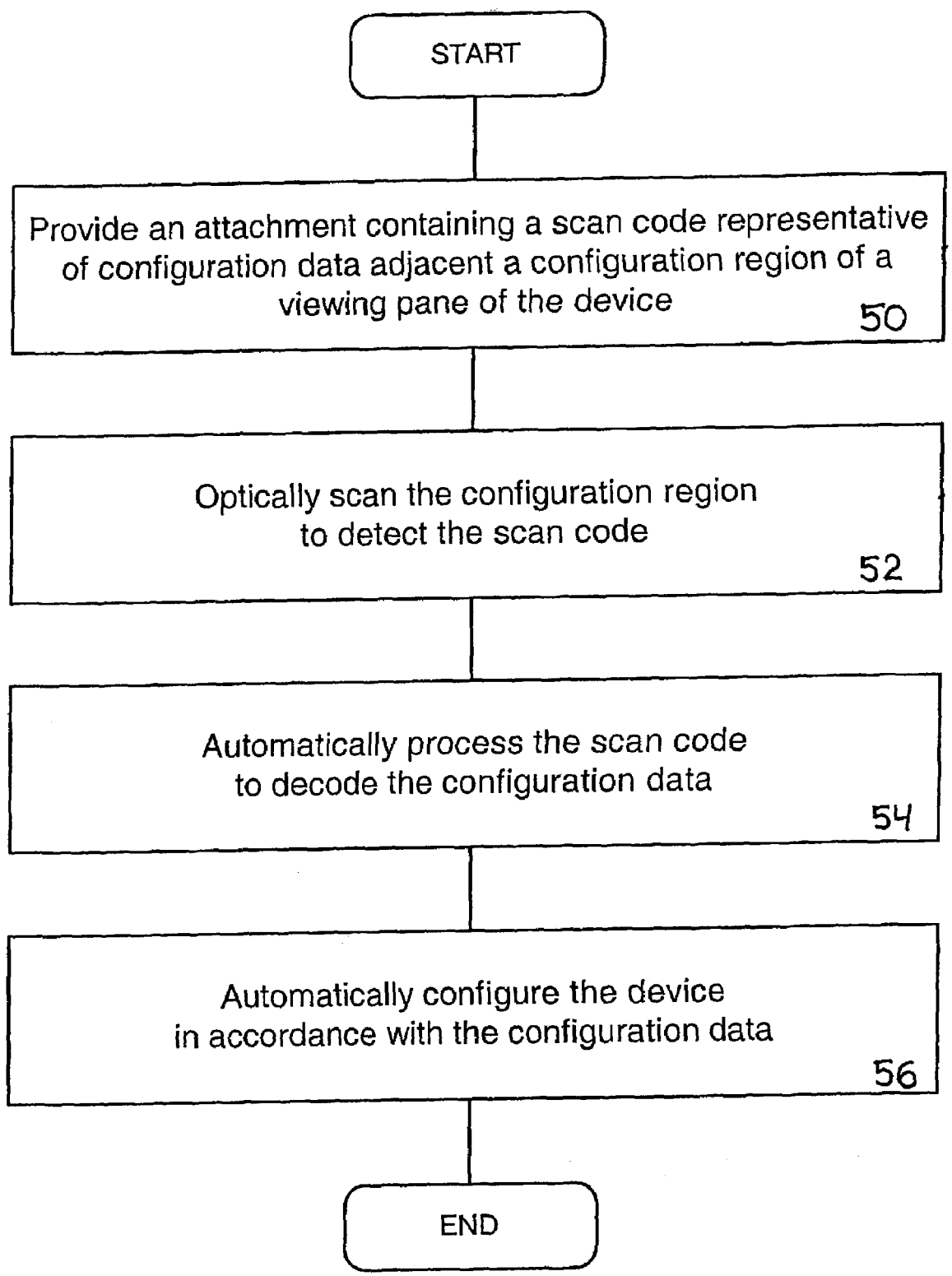
FIG. 6 is a flow chart depicting the general operation of a device according to an embodiment of the present invention.

Referring now to FIGS. 5 and 6, the general operation of an embodiment of the invention is shown and outlined. In the step designated as 50 in FIG. 6, an attachment is provided, placed, or is otherwise positioned (whether permanently or on a temporary basis) adjacent a configuration region in (or about) the viewing pane. In some embodiments, the attachment may be placed over an aperture on side 12a of lid 12 such that at least a relevant portion of the barcode 38 is positioned over aperture 24 and is in the readable optical view of optical assembly 26. In alternative embodiments, such as when an aperture is either not present or is not utilized, the barcode may instead be placed on the opposite side 12b of lid 12 (with the relevant information facing the optical reader) or may otherwise be positioned in the optical view or scanning range of the device.

In step 52, the device optically scans the configuration region (which typically includes the scanning region that a scan code may be expected to be present) and detects a scan code. Typically, the device 10 is turned on and an "initial" scan for a code is then conducted. However, depending upon the desired configuration and the programming associated with the device 10, the scan may be conducted once, every time the device is turned on, or at some other specified interval. In one embodiment, the initial programming of processor 35 instructs optics 32 and bulb 30 to scan the area between inner border 22 and outer border 20 to read barcode 38. However, as previously noted, the barcode may be positioned in other locations provided it can be read by the device.

In the step designated 54, the device 10 automatically processes the scan code and decodes the configuration data or other information. In one embodiment, the illumination or information obtained from the scan code is received by receiver 34 and is digitally interpreted by a connected processor 35.

In step 56, the device is automatically configured in accordance with the configuration data.

As a result, the specific settings such as language and other variable settings are set with minimal intervention by the technician or operator. Many different configurations may be effectuated in this manner, such as language (e.g., British spelling may be different from American spelling), paper size (such as A4 for European or standard for U.S.), operational speed (e.g., less expensive models may scan/print at a slower speed than more expensive models), default settings or other similar configurations.

In additional embodiments, a user may take a more active role in connection with the information or scan code used with the device. If desired, a user can print or otherwise obtain various scan codes that implement desired features or configurations associated with the device. For example, without limitation, when a device includes one or more controls (such as buttons, touch sensors, or switches), the user can provide an attachment with a scan code to configure one or more assignable or "programmable" controls. The ability to quickly and conveniently configure aspects or functions of the device to meet the particularly needs or desires of the user can be particularly useful in connection with devices that do not have a menu or display or that have a limited space available and/or a limited number of controls and a number of available programmable features that exceed the number of available corresponding controls.

For instance, in a device that includes just a handful of buttons, but has dozens of potential single-button-actuated functions, the user can provide a scan code to the device that will assign user-selected corresponding functions to the controls. By way of example, without restriction, some examples of user-defined functions include photo modes, fit-to-page modes, zoom settings, image reproduction and arrangements, etc. In such a manner, the user produced or introduced attachments allow the user to customize a significant number of aspects of the device. The attachment may include multiple overlays or be flipped over or reoriented to readily configure the device to perform a wide selection of additionally desired functions.

While the present invention has been particularly shown and described with reference to the foregoing embodiments, it should be understood by those skilled in the art that various alternatives to the embodiments of the invention described herein may be employed in practicing the invention without departing from the scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element of the equivalent thereof, such claims should be understood to include incorporation of one or more such elements, neither requiring nor excluding two or more such elements.

What is claimed is:

1. A device with a scanning feature, comprising:
a viewing pane;
an attachment mounted to the device, the attachment including a scan code representative of configuration information and positioned adjacent a portion of the viewing pane;
an optical assembly positionable in optical communication with the viewing pane, the optical assembly adapted to receive an image of the scan code; and
a processor adapted to process the image so as to decode the configuration information and configure an operational characteristic of the device according to the configuration information,
wherein the operational characteristic of the device includes at least one of a country of use of the device, a paper size for the device, and an operational speed of the device.

2. A method for configuring a device with a scanning feature, comprising:
providing a device having means for scanning an object;
positioning an attachment with a scan code within a scanning range of the means for scanning;
scanning the scan code with the means for scanning and obtaining information from the scan code; and
processing the information obtained from the scan code to configure one or more operational characteristics of the device,
wherein the one or more operational characteristics of the device include at least one of a country of use of the device, a paper size for the device, and an operational speed of the device.

3. A device with a scanning feature, comprising:
a body including a viewing pane;
a cover positioned over at least a portion of the viewing pane, the cover having a first side and a second side and an aperture extending from the first side to the second side;
an attachment positioned on the first side of the cover over the aperture, the attachment including a scan code;
a scanner positioned within the body for optionally scanning the scan code when the second side of the cover is adjacent the viewing pane; and
a processor adapted to process information obtained from the scan code and configure an operational characteristic of the device based at least in part on the information obtained from the scan code,
wherein the operational characteristic of the device includes a country of use of the device.

4. A device according to claim 3, wherein the scanner is adapted to automatically read or scan the scan code.

5. A device according to claim 3, wherein the scan code comprises a bar code.

6. A device according to claim 3, wherein the cover is connected to the body of the device.

7. A device according to claim 6, wherein the cover is connected to the body of the device by one or more hinges or connecting means.

8. A device according to claim 6, wherein the cover is rigidly affixed or connected to the body of the device.

9. A device with a scanning feature, comprising:
a body including a viewing pane;
a cover positioned over at least a portion of the viewing pane, the cover having a first side and a second side and an aperture extending from the first side to the second side;
an attachment positioned on the first side of the cover over the aperture, the attachment including a scan code;
a scanner positioned within the body for optionally scanning the scan code when the second side of the cover is adjacent the viewing pane; and
a processor adapted to process information obtained from the scan code and configure an operational characteristic of the device based at least in part on the information obtained from the scan code,
wherein the operational characteristic of the device includes a paper size for the device.

10. A device according to claim 9, wherein the scanner is adapted to automatically read or scan the scan code.

11. A device according to claim 9, wherein the scan code comprises a bar code.

12. A device according to claim 9, wherein the cover is connected to the body of the device.

13. A device according to claim 12, wherein the cover is connected to the body of the device by one or more hinges or connecting means.

14. A device according to claim 12, wherein the cover is rigidly affixed or connected to the body of the device.

15. A device with a scanning feature, comprising:
a body including a viewing pane;
a cover positioned over at least a portion of the viewing pane, the cover having a first side and a second side and an aperture extending from the first side to the second side;
an attachment positioned on the first side of the cover over the aperture, the attachment including a scan code;
a scanner positioned within the body for optionally scanning the scan code when the second side of the cover is adjacent the viewing pane; and
a processor adapted to process information obtained from the scan code and configure an operational characteristic of the device based at least in part on the information obtained from the scan code,
wherein the operational characteristic of the device includes an operational speed of the device.

16. A device according to claim 15, wherein the scanner is adapted to automatically read or scan the scan code.

17. A device according to claim 15, wherein the scan code comprises a bar code.

18. A device according to claim 15, wherein the cover is connected to the body of the device.

19. A device according to claim 18, wherein the cover is connected to the body of the device by one or more hinges or connecting means.

20. A device according to claim 18, wherein the cover is rigidly affixed or connected to the body of the device.

21. A device with a scanning feature comprising:
a main body including a viewing pane;
means for scanning an object placed on the viewing pane and reproducing an image of the object;
a cover positioned over at least a portion of the viewing pane, the cover including a first side and a second side in closer proximity to the viewing pane, and having an aperture passing from the first side to the second side; and
an attachment including a scan code;
wherein the attachment is positioned on the first side of the cover over the aperture within a range to be scanned by the means for scanning,
wherein the means for scanning is adapted to scan the scan code, and
wherein an operational characteristic of the device is configured based on information obtained from the scan code,
wherein the operational characteristic of the device includes a country of use of the device.

22. A device according to claim 21, wherein:
the cover is connected to the main body and can be moved between an open position and a closed position, and
the scan code is positioned in optical view of the means for scanning when the cover is in a closed or substantially closed position.

23. A device according to claim 21, wherein the attachment comprises a sticker adhesively attached to the first side of the cover.

24. A device according to claim 23, wherein the sticker includes a bar code on a first side and instructions on a second side.

25. A device according to claim 21, further comprising:
an inner border defining a common scanning region on the viewing pane;
an outer border disposed radially outside the inner border; and
wherein, when in proximity to the viewing pane, the aperture is positioned at least in part over a portion of the area defined on the viewing pane between the inner border and the outer border.

26. A device according to claim 21, wherein the cover is fixedly attached or connected to the main body.

27. A device with a scanning feature comprising:
a main body including a viewing pane;
means for scanning an object placed on the viewing pane and reproducing an image of the object;
a cover positioned over at least a portion of the viewing pane, the cover including a first side and a second side in closer proximity to the viewing pane, and having an aperture passing from the first side to the second side; and
an attachment including a scan code;
wherein the attachment is positioned on the first side of the cover over the aperture within a range to be scanned by the means for scanning,
wherein the means for scanning is adapted to scan the scan code, and
wherein an operational characteristic of the device is configured based on information obtained from the scan code,
wherein the operational characteristic of the device includes a paper size for the device.

28. A device according to claim 27, wherein:
the cover is connected to the main body and can be moved between an open position and a closed position, and
the scan code is positioned in optical view of the means for scanning when the cover is in a closed or substantially closed position.

29. A device according to claim 27, wherein the attachment comprises a sticker adhesively attached to the first side of the cover.

30. A device according to claim 29, wherein the sticker includes a bar code on a first side and instructions on a second side.

31. A device according to claim 27, further comprising:
an inner border defining a common scanning region on the viewing pane;
an outer border disposed radially outside the inner border; and
wherein, when in proximity to the viewing pane, the aperture is positioned at least in part over a portion of the area defined on the viewing pane between the inner border and the outer border.

32. A device according to claim 27, wherein the cover is fixedly attached or connected to the main body.

33. A device with a scanning feature comprising:
a main body including a viewing pane;
means for scanning an object placed on the viewing pane and reproducing an image of the object;
a cover positioned over at least a portion of the viewing pane, the cover including a first side and a second side in closer proximity to the viewing pane, and having an aperture passing from the first side to the second side; and
an attachment including a scan code;
wherein the attachment is positioned on the first side of the cover over the aperture within a range to be scanned by the means for scanning,
wherein the means for scanning is adapted to scan the scan code, and
wherein an operational characteristic of the device is configured based on information obtained from the scan code, wherein the operational characteristic of the device includes an operational speed of the device.

34. A device according to claim 33, wherein:
the cover is connected to the main body and can be moved between an open position and a closed position, and
the scan code is positioned in optical view of the means for scanning when the cover is in a closed or substantially closed position.

35. A device according to claim 33, wherein the attachment comprises a sticker adhesively attached to the first side of the cover.

36. A device according to claim 35, wherein the sticker includes a bar code on a first side and instructions on a second side.

37. A device according to claim 33, further comprising:
an inner border defining a common scanning region on the viewing pane;
an outer border disposed radially outside the inner border; and
wherein, when in proximity to the viewing pane, the aperture is positioned at least in part over a portion of the area defined on the viewing pane between the inner border and the outer border.

38. A device according to claim 33, wherein the cover is fixedly attached or connected to the main body.

39. A method for configuring a device with a scanning feature, comprising:
providing an attachment containing a scan code with configuration data for the device, at least a portion of the scan code is positioned within or adjacent a configuration region of a viewing pane of the device;
optionally scanning the configuration region to detect the scan code;
automatically processing the scan code to obtain the configuration data; and
automatically configuring an operational characteristic of the device based at least in part on the configuration data, and further comprising:
providing a cover of the device having a first side and a second side;
providing an aperture through the cover from the first side to the second side; and
applying the attachment containing the scan code on the first side of the cover over the aperture to place at least a portion of the scan code within or adjacent the configuration region when the second side of the cover faces the viewing pane,
wherein the operational characteristic of the device includes a country of use of the device.

40. A method according to claim 39, wherein the scan code comprises a barcode.

41. A method according to claim 39, wherein the cover of the device is moveably connected to the device.

42. A method according to claim 39, wherein the cover moves between an open position and a closed position, and the scan code is within the configuration region of the viewing pane of the device when the cover is in the closed or substantially closed position.

43. A method for configuring a device with a scanning feature, comprising:
providing an attachment containing a scan code with configuration data for the device, at least a portion of the scan code is positioned within or adjacent a configuration region of a viewing pane of the device;
optionally scanning the configuration region to detect the scan code;
automatically processing the can code to obtain the configuration data; and
automatically configuring an operational characteristic of the device based at least in part on the configuration data, and further comprising:
providing a cover of the device having a first side and a second side;
providing an aperture through the cover from the first side to the second side; and
applying the attachment containing the scan code on the first side of the cover over the aperture to place at least a portion of the scan code within or adjacent the configuration region when the second side of the cover faces the viewing pane,
wherein the operational characteristic of the device includes a paper size for the device.

44. A method according to claim 43, wherein the scan code comprises a barcode.

45. A method according to claim 43, wherein the cover of the device is moveably connected to the device.

46. A method according to claim 43, wherein the cover moves between an open position and a closed position, and the scan code is within the configuration region of the viewing pane of the device when the cover is in the closed or substantially closed position.

47. A method for configuring a device with a scanning feature, comprising:
providing an attachment containing a scan code with configuration data for the device, at least a portion of the scan code is positioned within or adjacent a configuration region of a viewing pane of the device;
optionally scanning the configuration region to detect the scan code;
automatically processing the scan code to obtain the configuration data; and
automatically configuring an operational characteristic of the device based at least in part on the configuration data, and further comprising:
providing a cover of the device having a first side and a second side;
providing an aperture through the cover from the first side to the second side; and
applying the attachment containing the scan code on the first side of the cover over the aperture to place at least a portion of the scan code within or adjacent the configuration region when the second side of the cover faces the viewing pane,
wherein the operational characteristic of the device includes an operational speed of the device.

48. A method according to claim 47, wherein the scan code comprises a barcode.

49. A method according to claim 47, wherein the cover of the device is moveably connected to the device.

50. A method according to claim 47, wherein the cover moves between an open position and a closed position, and the scan code is within the configuration region of the viewing pane of the device when the cover is in the closed or substantially closed position.

* * * * *

UNITED STATES PATENT AND TRADEMARK OFFICE
CERTIFICATE OF CORRECTION

PATENT NO. : 7,405,847 B2  
APPLICATION NO. : 10/377423  
DATED : July 29, 2008  
INVENTOR(S) : David Bradley Short et al.

Page 1 of 1

It is certified that error appears in the above-identified patent and that said Letters Patent is hereby corrected as shown below:

In column 10, line 5, in Claim 43, delete "can" and insert -- scan --, therefor.

Signed and Sealed this

Twelfth Day of May, 2009

JOHN DOLL  
*Acting Director of the United States Patent and Trademark Office*